United States Patent [19]

Huang et al.

[11] Patent Number: 5,748,904
[45] Date of Patent: May 5, 1998

[54] METHOD AND SYSTEM FOR SEGMENT ENCODED GRAPHIC DATA COMPRESSION

[75] Inventors: Hung-Ju Huang; Jo-Tan Yao, both of Taipei; Chung-Heng Chen, Chia-Yi, all of Taiwan

[73] Assignee: Silicon Integrated Systems Corp., Hsinchu, Taiwan

[21] Appl. No.: 713,598

[22] Filed: Sep. 13, 1996

[51] Int. Cl.$^6$ ................................................. G06F 13/00
[52] U.S. Cl. ............................... 395/200.77; 345/202
[58] Field of Search ......................... 395/200.77, 114, 395/116, 508, 511, 519, 117, 480, 497.02, 497.04; 345/200, 201, 113, 202; 364/715.02

[56] References Cited

U.S. PATENT DOCUMENTS 4,679,038  7/1987  Bantz ........................... 345/201
5,638,498  6/1997  Tyler et al. ..................... 395/115

Primary Examiner—Ellis B. Ramirez

[57] ABSTRACT

A method and system for compressing graphic data by dividing the data into segments is disclosed. The size of the divided segment is programmable. A frame buffer partitioned into a compressed frame buffer and an uncompressed frame buffer stores graphic data. Each segment of the graphic data is compressed by three different algorithms that encode the graphic data as a plurality of code-words. Each code-word for the segment is taken from the algorithm that can compress the largest number of pixels in the code-word. A header is used to indicate the number of code-words and the compression method used in each code-word. The total number of bytes obtained from the compression of a segment is compared to a pre-defined limit to determine if the compression of the segment is successful. The successfully compressed data of a segment are written to the compressed frame buffer. A compression status flag buffer is used to identify if a segment is compressed or not. A decompressor decompresses or passes the graphic data to a pixel stream for display according to the compress status flag.

4 Claims, 7 Drawing Sheets

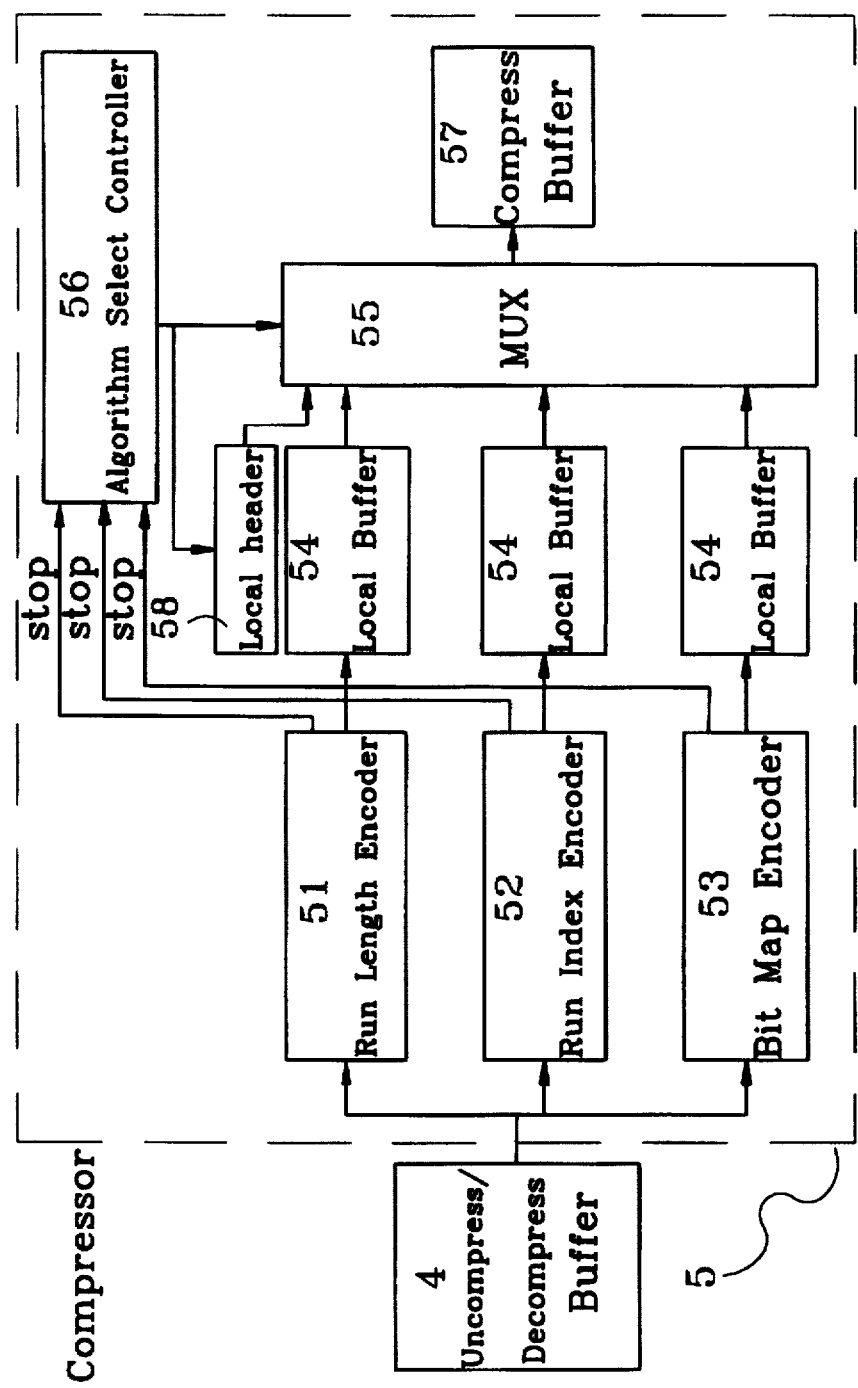
F I G. 2

—Compression Method(CM)

1. Run Length

| 0 | 0 |
|---|---|

2. Run Index

| 0 | 1 |
|---|---|

3. Bitmap

| 1 | 0 |
|---|---|

4. Bitmap with Color

| 1 | 1 |
|---|---|

F I G. 4

—Header Format

| Length | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 |
|---|---|---|---|---|---|---|---|---|---|---|---|---|---|---|---|---|---|---|---|---|---|---|---|---|---|---|---|---|---|

F I G. 5

*4-bit run length, 4-bit index

| Run | Index | Run | Index | Run | Index | Run | Index | Run | Index | Run | Index | Run | Index | Run | Index |
|---|---|---|---|---|---|---|---|---|---|---|---|---|---|---|---|
| 4 | 4 | 4 | 4 | 4 | 4 | 4 | 4 | 4 | 4 | 4 | 4 | 4 | 4 | 4 | 4 |

F I G. 6

*5-bit run length, 16-bit data

| Run | Run | Run | Data2 | Data1 | Data0 |
|---|---|---|---|---|---|
| 5 | 5 | 5 | 16 | 16 | 16 |
| 1 | | | | | |

F I G. 7

*8-bit run length, 24-bit data

| Run | Run | Run | Data1 | Dsta0 | Data1 | Data0 |
|---|---|---|---|---|---|---|
| 3 | 3 | 5 | 5 | 8 | 8 | 16 | 16 |

FIG. 8

*Bit-map With Color Index

| Run | Index0 | Index1 | Bit-map Data |
|---|---|---|---|
| 6 | 4 | 4 | 50 |

FIG. 9

*Bit-map With 16-bit Color and Color Index

| Run | Index0 | Color1 | Bit-map Data |
|---|---|---|---|
| 6 | 4 | 16 | 38 |

FIG. 10

*Bit-map with 24-bit Color and Color Index

| Run | Index0 | Color1 | Bit-map Data |
|---|---|---|---|
| 6 | 4 | 24 | 30 |

FIG. 11

METHOD AND SYSTEM FOR SEGMENT ENCODED GRAPHIC DATA COMPRESSION

FIELD OF THE INVENTION

The present invention relates to the compression of graphic data in a computer graphic system, and more specifically to a method and system for segmenting and compressing the computer graphic data.

BACKGROUND OF THE INVENTION

Due to the popularity of the window based graphical user interface, most modern computer systems require a high resolution video monitor and an advanced graphic system. The graphic system usually comprises a frame buffer having a couple of Mbytes of DRAMs for storing computer graphic data. The large amount of graphic data that have to be frequently updated by the host computer and displayed to the video monitor have greatly impacted the efficiency of a computer system.

In order to provide high performance for a computer system, various design techniques have been used to enhance the graphics system. The graphic data stored in the frame buffer typically includes many pixels of the same color continuously or a few colors in a sequence of pixels. When the graphic data contain text data, the pixels usually have only two colors repeated alternatively. Therefore, a lot of redundancy exists in the computer graphic data. One of the technique commonly used in improving the speed of transferring the graphic data is data compression.

Conventionally, when the compression technique is used in a graphic system, a selected compression algorithm is designed and implemented. When the computer is in operation, all the graphic data in the frame buffer are compressed by the selected compression technique. However, different part of the graphic data contained in the frame buffer while a program is running may have different type of data redundancy. In addition, different application program may also have graphic data in a different nature. It is often very difficult for the selected compression technique to achieve its optimal compression ratio.

SUMMARY OF THE INVENTION

The present invention has been made to overcome the above-mentioned drawback and improve the effectiveness of a computer graphic system. In this invention, the graphic data are partitioned into segments. Each segment contains a plurality of pixels. The size of the segment is programmable. The frame buffer that contains DRAMs is divided into two regions. One is an uncompressed frame buffer and the other is a compressed frame buffer. The graphic data stored in DRAMs are read in a segmented format and compressed.

According to the present invention, a compression segment size that is programmable is defined to set the limit of the maximum size of the compressed data for each segment of graphic data. The compression is regarded as a failure if the size of the compressed data for a segment exceeds the compressed segment size programmed. For a failed compression, the original uncompressed data are stored in the uncompressed frame buffer without change. If a segment is compressed successfully, the compressed data are stored in the compressed frame buffer. A SRAM buffer is used to indicate the compression status of each segment in the graphic data. Each bit in the SRAM buffer serves as a status flag of a segment. If a given segment is compressed successfully, its corresponding status flag is set to 1. Otherwise, it is set to zero.

The data format of a segment after compression consists of one code-word header followed by a plurality of code-words. In the present invention, three different compression algorithms are executed at the same time for each segment of graphic data. Each compression algorithm is coded by a 2-bit index. The compressor of this invention dynamically selects the best result obtained from the three different compression algorithms. The best compressed result is used as the compressed data. A code-word stores both the index of the compression algorithm and the compressed data.

According to the compression method of this invention, the redundant information in the graphic data is reduced very effectively because the best compressed result is used dynamically. The compressed data stored in the DRAMs can be easily fetched during a CRT refresh cycle. Therefore, more bandwidth is available for the host CPU to access the data in the DRAMs of the frame buffer.

BRIEF DESCRIPTION OF THE DRAWINGS

FIG. 2 shows the block diagram of the compressor of the graphic system as shown in FIG. 1.

FIG. 4 shows 2-bit codes that are used for specifying different compression methods in the present invention.

FIG. 5 shows the format of the code-word header for a compressed segment.

FIG. 6 shows the format of the code-words for the run index compression method.

FIG. 7 shows the format of the code-words for the run length compression method in a 16-bit high color mode.

FIG. 8 shows the format of the code-words for the run length compression method in a 24-bit true color mode.

FIG. 9 shows the format of the code-words for the bit-map compression method in a 4-bit color index mode.

FIG. 10 shows the format of the code-words for the bit-map compression method in a 16-bit color and 4-bit color index mode.

FIG. 11 shows the format of the code-words for the bit-map compression method in a 24-bit color and 4-bit color index mode.

DETAILED DESCRIPTION OF THE PREFERRED EMBODIMENTS

Figure 1:
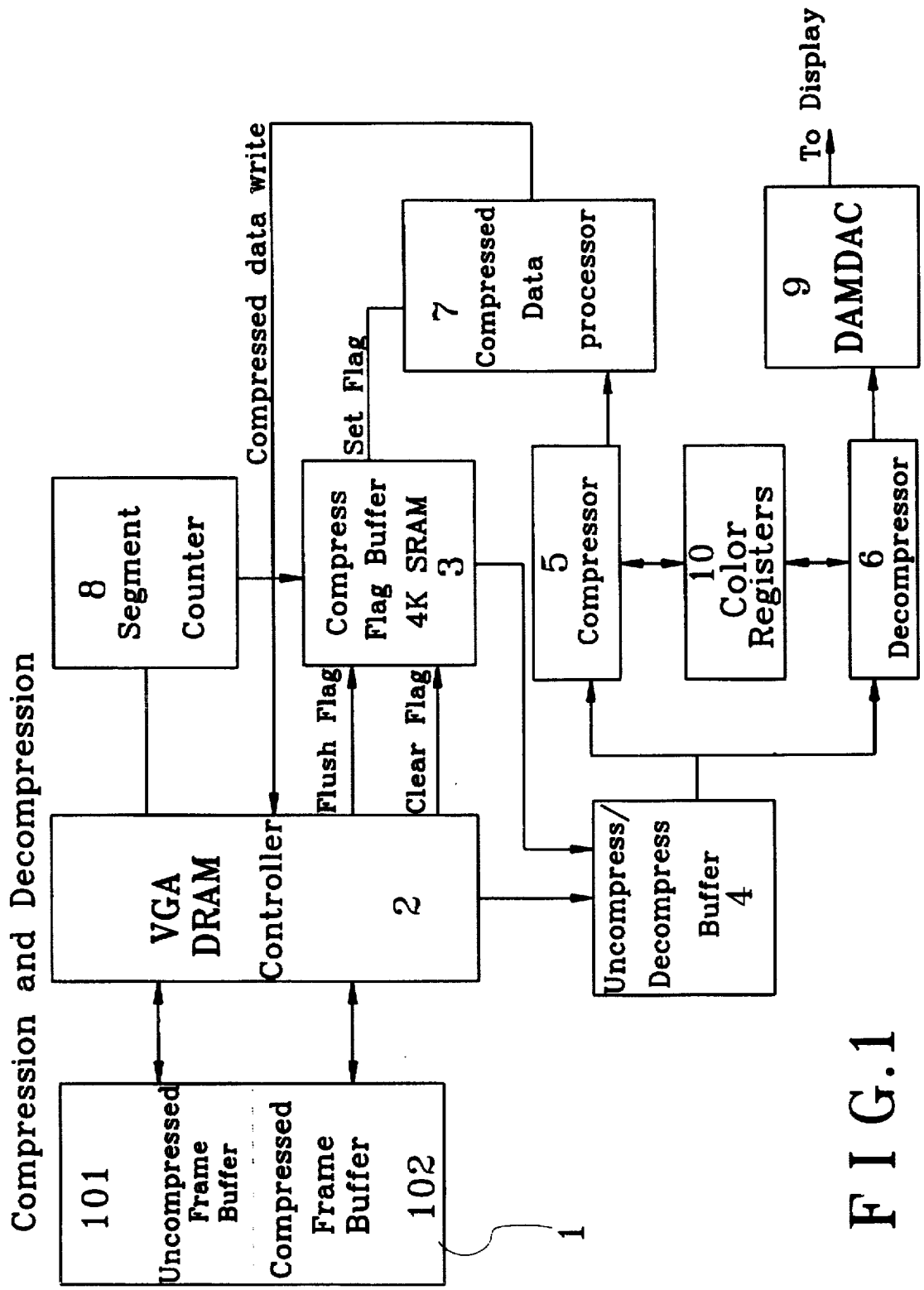
FIG. 1 shows a block diagram of the preferred embodiment of the graphic system of this invention.

With reference to FIG. 1, the preferred embodiment of the graphic system of this invention has a frame buffer 1 that is partitioned into an uncompressed frame buffer 101 and a compressed frame buffer 102. The frame buffer comprises DRAMs for storing graphic data of the computer system. A VGA DRAM controller 2 is used to control the operation of the graphic system.

When the graphic system is set in a compression/decompression mode, the graphic data in the DRAMs are first rearranged and compressed. The graphic data are divided into a plurality of segments. The size of the segment is programmable. It can be 1, ½ or ¼ of the line width of the display screen. It can also be defined as 128, 256, 512 or 1024 bytes regardless of the color depth. As an example, in a 1280×1024 resolution and 256 color mode a frame of graphic data can be divided into 4096 segments if the size of every segment is programmed as 320 bytes. In some cases, a segment may contain a few pixels of one screen line and a few pixels of an adjacent line.

Each segment of graphic data is compressed by the method and mechanism of this invention. A compressed segment size (in bytes) is defined to set the limit of the maximum size of compressed data for a segment. When a segment of data are compressed, the compression is regarded as a failure if the size of the compressed data becomes larger than the defined compressed segment size. The compressed data are ignored and the original uncompressed data in the segment remain unchanged in the uncompression frame buffer 101. The compressed segment size (in bytes) is also programmable. The larger the compressed segment size is, the higher the compression ratio can be achieved. Four different compressed segment sizes can be selected in the preferred embodiment.

A compression flag buffer 3 having 4k bit SRAM is used to indicate the status of compression for each segment. If a segment is compressed successfully, the corresponding compression flag is set and the compressed data are written to the compressed frame buffer 102. The 4k bits of compression flags can support up to 4096 segments. The start of the compression/decompression mode initializes the graphic system of this invention and flushes all the flags to 0. The segment data in the DRAMs of the uncompressed frame buffer are read out in 64 bits by the DRAM controller and stored in an uncompress/decompress FIFO 4 that consists of a dual-port 64×65 SRAM. In the beginning, all of the segments are not compressed. The flushed flag in the 4k-bit SRAM will cause the system to assign a zero bit to the uncompressed data in the uncompress/decompress FIFO buffer 4. Therefore, the 64 bit uncompressed data read from the DRAMs are stored in the uncompress/decompress FIFO 4 as 65 bit code-words in which the most significant bit is called the flag bit.

The uncompressed data also pass through a compressor 5 for compression. FIG. 2 shows the block diagram of the compressor of the preferred embodiment. In the present invention, three different algorithms are used concurrently. As shown in FIG. 2, the input data are first buffered in the uncompress/decompress FIFO 4. The compressor 5 has three different encoders, i.e. a run length encoder 51, a run index 52, and a bit-map encoder 53. For adjoining pixels with a same color, the run length encoder 51 can compress the data with a very high compression ratio. The run index encoder 52 is better at compressing adjoining pixels with a few colors. For pixels of text data with only two colors, the bit-map encoder 53 generally gives the most efficient compression.

Each different encoder has a local buffer 54 for buffering the code-word generated by the encoder. The output from each local buffer 54 is connected to a multiplexer (MUX) 55 which is controlled by an algorithm select controller 56. Graphic data in one segment are read and compressed pixel by pixel through the compressor 5. Code-words are generated by each different encoder. The code-word that can compress the largest number of pixels is used as the compressed data. A compression algorithm would stop if its current code-word can not encode more pixels. Based on the output of each encoder, the algorithm select controller 56 determines which code-word should be selected. The code-word coming out of the multiplexer 55 is then buffered in a compress buffer 57. A plurality of code-words are thus generated for one segment until all pixels have been compressed. A local header 58 is also generated by the algorithm select controller 56 to keep track of the compression methods for the selected code-words and the total number of code-words. After the compression of a segment, the local header 58 becomes the code-word header of the compressed data segment.

The compressed data for each segment include a code-word header followed by a plurality of code-words. The total number of bytes including the code-word header and all code-words for each segment is defined as the size of the compressed data. After compression, both the code-words in the compressor buffer 57 and the size of the segment after compression are sent to a compressed data processor 7 for comparing with the compressed segment size discussed above to determine if the compression is successful. If it is a successful compression, the compressed data are written to the compressed frame buffer 102. The flag in the compression flag buffer 3 corresponding to the segment is set to indicate that the segment is compressed. A segment counter 8 is designed to identify which segment is processed and the corresponding flag, and to ensure that the memory address is managed correctly when the rearranged data in the DRAMs are read or written. If the compression fails, the data of the segment in DRAMs of the uncompressed frame buffer 101 are not changed and its corresponding flag is set to 0. The compressed data are not written to the compressed frame buffer 102.

After the data rearrangement in the DRAMs of the frame buffer 1 is completed, the graphic data are processed and sent to a RAMDAC 9 before displaying on a video monitor. During a CRT refresh cycle, the data are read into the uncompress/decompress FIFO 4. As discussed earlier, the FIFO consists of a 64×65 dual-port SRAM. Every 64 bits of data are read from DRAMs and assigned a flag bit of 0 or 1 to the most significant bit dependent on whether the segment is compressed or not to form 65 bit data in the FIFO. If the data are compressed, they are sent to a decompressor 6 for decompression. As shown in FIG. 1, the graphic data to be displayed is either passed or decompressed by the decompressor 6 before sending to the RAMDAC 9.

Figure 3:
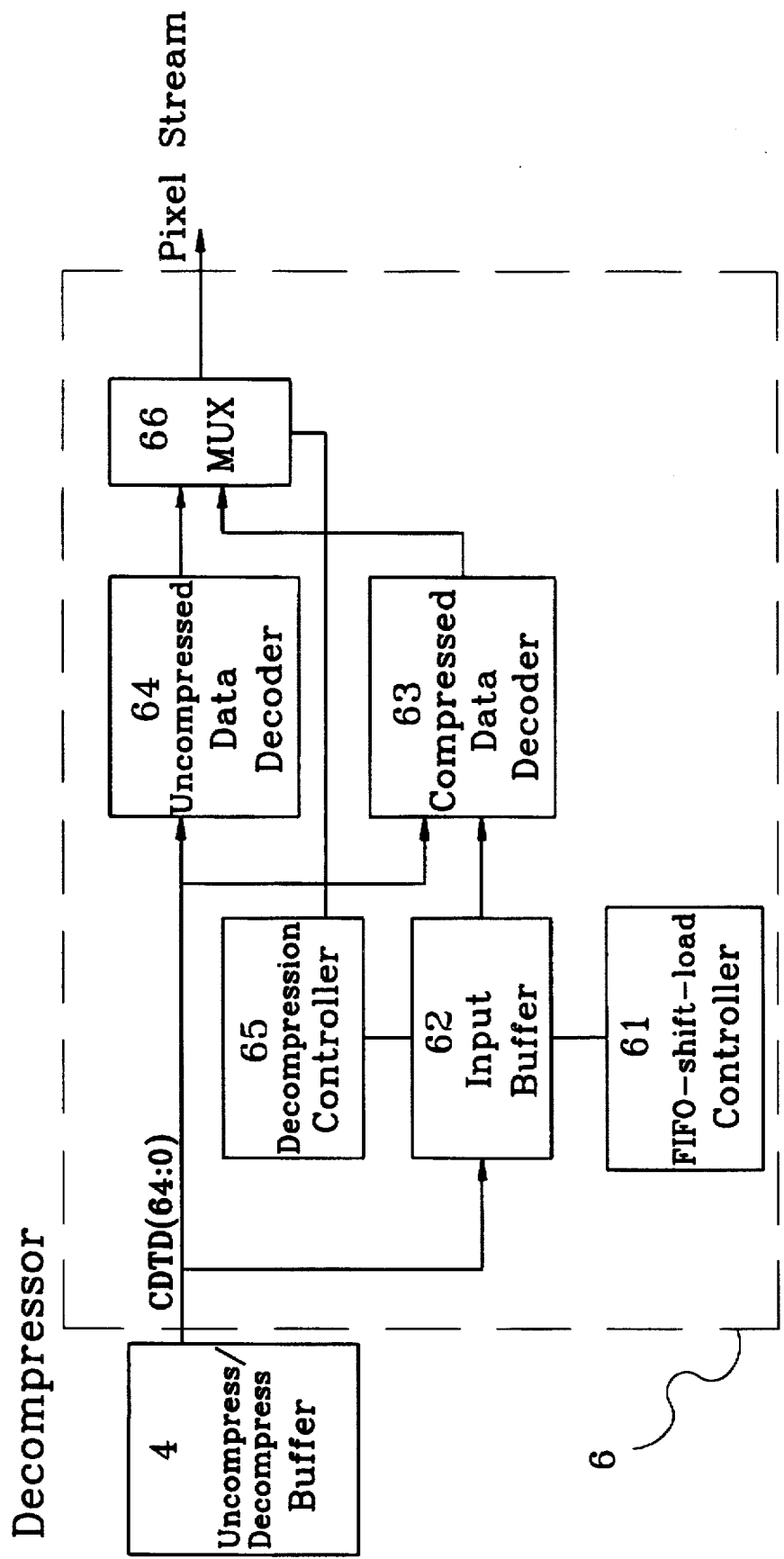
FIG. 3 shows the block diagram of the decompressor of the graphic system as shown in FIG. 1.

FIG. 3 shows the block diagram of the decompressor 6. When the graphic system is operated in the compression/decompression mode, the data stored in the uncompression/compression FIFO 4 for display are loaded to the decompressor and decoded into pixel streams. A FIFO-shift-load controller 61 is responsible for loading new 65 bit data (CDTD[64:0]) from FIFO 4 to an input buffer 62. If the most significant bit CDTD64 is 1, the data CDTD[63:0] represent compressed data. The first CDTD[63:0] of the compressed data for a segment is a code-word header as discussed earlier. The header of the compressed segment is stored in the input buffer 62 during the process of compressing the segment. The code-words contained in CDTD[64:0] after the code-word header are sent to and decompressed by the compressed data decoder 63. The information contained in the code-word header is sent from the input buffer 62 to the compressed data decoder 63 to determine which encoding method should be used for the decompressing of each code-word.

If the most significant bit CDTD64 is 0, the data CDTD [63:0] have not been compressed. They are sent to the uncompressed data decoder 64 that essentially passes the data through. Both outputs from compressed data decoder 63 and uncompressed data decoder 64 are sent to a multiplexer 66. A decompression controller 65 that takes the flag bit from the input buffer 62 controls the multiplexer 66 in order to pass correct pixels from the two data decoders through the multiplexer 66.

The format of the code-word header is defined to specify the length of the compressed data in the unit of a code-word for the processed segment as well as the compression algorithm used in each code-word. Because there are three different compression algorithms used in this invention, 2 bits are necessary for the identification of the algorithm used in a code-word. The algorithm used in the bit-map encoder 53 can be implemented with two methods of encoding, i.e. bit-map and bit-map with color. Therefore, in this invention there four methods of encoding including run length encoding, run index encoding, bit-map encoding and bit-map with color encoding that can be specified with 2 bits. FIG. 4 shows the two bit code for indicating each compression method.

The code-word header has 64 bits and the most significant 6 bits are used for specifying the length of the code-words except for two special cases. For code-word lengths from 1 to 29, the length can be coded into the lower 5 bits of the most significant bits by setting the most significant bit to 0. The remaining 58 bits in the header are long enough to identify compression methods for the 29 code-words. FIG. 5 shows the data structure of the header. For code-word having a length of 30 or 31, the most significant bit of the header is set to 1 and the second most significant bit is used to indicate if the length is 30 or 31. Under these circumstances, the remaining 62 bits are long enough to identify compression methods for the 30 or 31 code-words.

The data formats of the code-words in this invention depend on the encoding method. In the run index coding, a code-word consists of 8 groups of 4-bit color indices and their corresponding 4-bit runs as shown in FIG. 6. The graphic system of the invention comprises color registers 10 as can be seen in FIG. 1. The 4-bit index can be used to point to 16 compression color registers which can store a 16-bit or 24-bit color. They are used to improve the compression ratio. In the preferred embodiment of the invention, only eight color registers with indices from 0 to 7 can be programmed by software. The most frequently used colors such as the system colors of Microsoft Window must be programmed into these programmable registers. The other eight color registers with indices from 8 to 15 are automatically adapted to the colors of the screen. They are only readable to the software.

In the run length coding, there are two different data formats. One is for 16-bit high color mode and the other for 24-bit true color mode. In the 16-bit high color mode, three 16-bit color pixel data and three 5-bit runs are organized as shown in FIG. 7. The most significant bit is not used in this case. In the 24-bit true color mode, two 8-bit runs and two corresponding 24-bit color pixel data are organized as shown in FIG. 8.

In the bit-map coding, three data formats are used for the code-words, i.e., bit-map with color index, bit-map with 16-bit color and color index, and bit-map with 24-bit color and color index. The bit-map with color index format consists of a 6-bit run which denotes the number of encoded pixels with the same color index, two 4-bit color indices that represent two color data in the color registers 10, and 50-bit bit-map data that denote what color index the corresponding pixel is encoded. FIG. 9 shows the format of such a code-word.

The format of the bit-map with color and color index contains a 6-bit run, a 4-bit color index, 16-bit (or 24-bit) color data, and 38-bit (or 30-bit) bit-map data as shown in FIGS. 10 and 11 for 16-bit color and 24-bit color respectively. It is worth while to point out that when the compressor encodes a pixel with a new color, the new data are encoded in the code-word and put into the color registers 10 adaptively in bit-map with color and color index modes. It is not necessary to encode the same color data that appear in the local region of the graphic data with full precision. Only the color index of the color data has to be encoded. The compression ratio is improved adaptively and the efficiency of the graphic system is increased in the preferred embodiment.

What is claimed is:

1. A method of compressing graphic data in a graphic system having a frame buffer partitioned into an uncompressed frame buffer and a compressed frame buffer, comprising the steps of:

a. dividing said graphic data stored in said uncompressed frame buffer into a plurality of uncompressed segments each having a plurality of pixels;

b. preparing a compression status flag buffer having a plurality of status flags being set to zero, each of said status flags indicating the compression status of one of said uncompressed segments;

c. reading and compressing the plurality of pixels of an uncompressed segment pixel by pixel using a plurality of compression methods for forming a compressed segment including a header and a plurality of code-words for said uncompressed segment, said compressed segment being generated by the steps of:

d. formatting said header for the storage of a length code and a plurality of method codes;

e. reading pixels from said uncompressed segment and determining the number of pixels that can be encoded in a code-word for each of said compression methods;

f. selecting and saving the code-word of the compression method that encodes the largest number of pixels into said code-word;

g. identifying the selected compression method with a method code and recording said method code in said header orderly;

h. repeating steps d., e., f. and g. until all pixels of said uncompressed segment have been encoded;

i. and forming said compressed segment by counting the total number of all saved code-words, recording said total number in said length code and appending all saved code-words orderly to said header;

j. determining the total number of bytes in said compressed segment and comparing the total number of bytes with a pre-defined limit;

k. writing said compressed segment to said compressed frame buffer and setting the corresponding status flag to 1 if the total number in step j. is smaller than said limit;

l. and repeating steps c., j. and k. until all uncompressed segments have been processed;

wherein when said graphic data after compression are sent for display, the compression status of each segment is determined by its corresponding status flag, the compressed segment are decompressed if the corresponding status flag is set, and each code-word is decompressed by a decompression method corresponding to the compression method code stored in the header of the compressed segment.

2. A segment encoded graphic data compression system comprising:

a frame buffer being partitioned into a compressed frame buffer and an uncompressed frame buffer, said uncompressed frame buffer having uncompressed graphic data divided into a plurality of segments;

a VGA DRAM controller for controlling the access of data in said frame buffer;

an uncompress/decompress FIFO, said VGA DRAM controller reading an uncompressed data segment from said frame buffer to said FIFO for compression;

a compressor for compressing said uncompressed graphic data segment sent from said FIFO and encoding said uncompressed graphic data segment into a compressed data segment having a compressed data size;

a compressed data processor receiving said compressed data segment and said compressed data size from said compressor, said data processor writing said compressed data segment to said compressed frame buffer through said VGA DRAM controller and setting a corresponding flag in a compression flag buffer to one if said data size is smaller than a pre-defined limit;

a decompressor receiving a compressed or uncompressed data segment from said FIFO and converting the data segment into a pixel stream for display, said compression flag buffer sending a flag corresponding to the data segment to said FIFO to enable the decompression of the data segment if the corresponding flag is zero or pass the data segment through if the corresponding flag is one;

a RAMDAC receiving said pixel stream for display;

a plurality of color registers providing the storage of pixel colors for an uncompressed data segment, said compressor encoding pixel colors of the uncompressed data segment into color indices contained in the corresponding compressed data segment and said decompressor decoding said color indices into pixel colors for display, each of said color indices pointing to a pixel color stored in said color registers for improving the compression ratio of said compressor;

and a segment counter controlling said compression flag buffer and said VGA DRAM controller for coordinating the selection of a data segment and its corresponding flag for the operation of compression or decompression.

3. The segment encoded graphic data compression system according to claim 2, said compressor further comprising:

a plurality of encoders and corresponding local buffers, each of said encoder having a different compression algorithm and receiving pixel data of an uncompressed data segment from said FIFO and compressing the pixel data into a code-word and saving said code-word in its corresponding local buffer;

an algorithm select controller selecting the encoder that encodes the largest number of pixel data into its corresponding code-word;

and a multiplexer controlled by said algorithm select controller for passing the code-word of the selected encoder from its corresponding local buffer to a compress buffer;

wherein each uncompressed data segment is read from said frame buffer to said FIFO and compressed as a compressed data segment stored in said compress buffer, said compressed data segment including a code-word header recording the algorithm of the encoder selected for each code-word and the number of code-words, and all the code-words generated by the selected encoders.

4. The segment encoded graphic data compression system according to claim 3, said decompressor further comprising:

a FIFO-shift-load controller for loading a compressed or uncompressed data segment stored in said FIFO to an input buffer, said input buffer storing the code-word header of the data segment if the data segment is a compressed data segment;

a compressed data decoder controlled by the code-word header stored in said input buffer for decoding a compressed data segment read from said FIFO;

an uncompressed data decoder for passing an uncompressed data segment read from said FIFO;

and a decompression controller for controlling a multiplexer to pass either the ouput of said compressed data decoder or said uncompressed data decoder based on the data of the code-word header stored in said input buffer.

* * * * *